United States Patent

[11] 3,614,621

[72] Inventors Ronald H. Chapman
Wheaton;
George G. Moore, Chicago, both of Ill.
[21] Appl. No. 848,628
[22] Filed Aug. 8, 1969
[45] Patented Oct. 19, 1971
[73] Assignee Motorola, Inc.
Franklin Park, Ill.

[54] MULTIFREQUENCY RECEIVER WITH AUTOMATIC CHANNEL SELECTION AND PRIORITY CHANNEL MONITORING
17 Claims, 2 Drawing Figs.

[52] U.S. Cl. .................................................... 325/334, 325/335, 325/469
[51] Int. Cl. .................................................... H04b 1/36
[50] Field of Search .............................................. 325/2, 3, 31, 56, 334, 335, 438, 452, 453, 464, 468, 469, 470, 67, 363; 343/205, 206; 331/179

[56] References Cited
UNITED STATES PATENTS

| | | | |
|---|---|---|---|
| 2,825,804 | 3/1958 | Rug | 325/470 X |
| 3,470,481 | 9/1969 | Myers | 325/31 X |
| 3,531,724 | 9/1970 | Fathauer | 325/469 |

*Primary Examiner*—Benedict V. Safourek
*Attorney*—Mueller & Aichele

ABSTRACT: A channel scanning and priority channel monitoring circuit for a multifrequency receiver utilizes a bistable multivibrator to control the local oscillator frequencies corresponding to the channels, with one output of the multivibrator corresponding to the priority channel. A low-frequency free-running oscillator and a pair of monostable delay circuits, having a relatively short time interval, produce pulses to change the state of the multivibrator. With no signals being detected on any of the channels, the multivibrator is controlled by the monostable delay circuits to provide a relatively rapid sequential scanning of the channels. Detection of a carrier on a nonpriority channel, however, shifts control of the bistable multivibrator to the free-running oscillator to reset the bistable multivibrator to scan the priority channel, whereupon control is returned to the monostable circuits. Provision is made for attenuating the audio output whenever a nonpriority channel is being received and for increasing the sensitivity of the squelch circuit whenever a nonpriority channel is being scanned.

INVENTORS
RONALD H. CHAPMAN
GEORGE G. MOORE
BY
Mueller, Aichele & Rauner
ATTYS.

INVENTORS
RONALD H. CHAPMAN
GEORGE G. MOORE
BY
Mueller, Aichele & Rauner
ATTYS.

MULTIFREQUENCY RECEIVER WITH AUTOMATIC CHANNEL SELECTION AND PRIORITY CHANNEL MONITORING

BACKGROUND OF THE INVENTION

Multifrequency receivers are known having automatic switching apparatus for selecting tuning elements to provide reception on a plurality of different channels. The channels may be selected by an automatic control system which selectively connects different tuned circuits in the receiver circuit until a carrier wave is detected on a channel, at which time the automatic switching is terminated.

In some cases it is desirable to assign a priority to one of the channels and to receive this channel at all times during which a signal may be transmitted on it. In a system having such a priority channel, it is necessary continually to sample the priority channel during the reception of signals on other channels and to lock onto the priority channel whenever a carrier is detected during the sampling interval.

For systems providing such a priority operation, the length of time that each of the channels is sampled when no carriers are detected on any of the channels should be relatively short in order to permit rapid scanning of all of the channels for a received carrier. If a carrier is detected on a nonpriority channel, it is desired to remain tuned to the nonpriority channel most of the time, with periodic sampling of the priority channel taking place only for a length of time sufficient to detect the presence of a carrier on the priority channel but short enough to prevent the production of an audible hole in the received transmission on the nonpriority channel. In the event that a carrier is detected on the priority channel during the sampling interval, the system should lock onto the priority channel and stay locked to the priority channel until transmission terminates.

In addition, it is desirable to provide a means for increasing the sensitivity of the system to the detection of a carrier on the nonpriority channel and also to provide a signal to enable the operator to readily ascertain whether or not the channel being received is the priority channel.

SUMMARY OF THE INVENTION

Accordingly it is an object of the present invention to provide an improved multifrequency superheterodyne receiver operable on a plurality of channels with a channel switching system which continuously monitors a priority channel during reception of a nonpriority channel.

It is an additional object of this invention to scan the different channels which can be received by a multifrequency receiver under the control of a switching control system including low speed and high speed clock pulse circuits for operating the switching system, with both of the clock circuits being disabled when a carrier is received on the nonpriority channel and with the high speed clock circuit being disabled when a carrier is received on the nonpriority channel.

It is another object to attenuate the audio output of a multichannel radio receiver when the receiver is tuned to a nonpriority channel.

It is a further object of this invention to increase the sensitivity of a multifrequency receiver for receipt of signals on a nonpriority channel whenever the channel is being sampled by the channel sampling circuitry of the receiver.

In accordance with a preferred embodiment of the invention, a multichannel superheterodyne receiver includes an oscillator means having a plurality of different outputs corresponding in frequency to the different channels to be received by the receiver. A switching means, having different conditions of operation, for controlling the oscillator means is operated in response to clock pulses obtained from a first clock pulse producing means providing clock pulses at a relatively low frequency. The switching means also is controlled by clock pulses from a second clock pulse producing circuit which provides clock pulses to the switching means at a higher frequency.

In the absence of a received carrier on any of the channels, operation of the switching means is under control of both the first and second clock pulse producing means. Receipt of a carrier signal during a sampling interval causes an output to be obtained from a signal detection means for inhibiting the application of clock pulses to the switching means.

If the channel on which the signal is detected is the priority channel, the switching means remains set to this channel until the termination of signals thereon. If, however, the signal is detected on the nonpriority channel, means responsive to the output of the switching means is utilized to disable the inhibiting of the clock pulses from the first clock pulse producing means; so that the next clock pulse obtained therefrom changes the condition of operation of the switching means to its priority state. When the switching means is set to its priority state or condition, an output is obtained for changing the bias level establishing the sensitivity of the signal detecting means; so that the detecting means is rendered less sensitive to received signals during scanning of the priority channel than it is during scanning of the nonpriority channel. In addition, a switch means in shunt with an impedance is provided to attenuate the audio signals of the radio for receipt of nonpriority channels; so that an audible distinction may be detected by the operator of the radio due to a difference in the loudness of the reproduced signals when switching from a nonpriority to a priority channel occurs.

DETAILED DESCRIPTION

Figure 1:
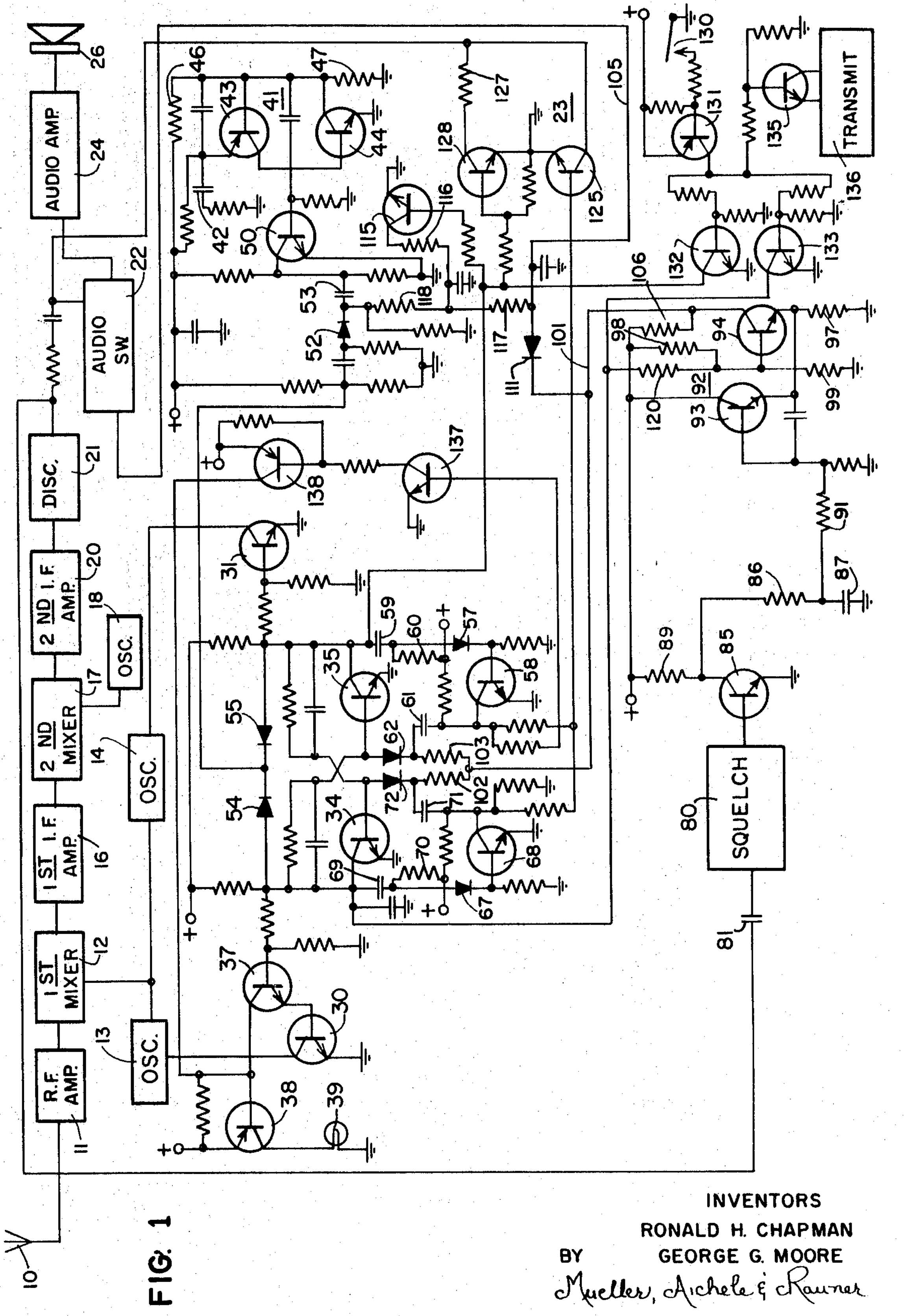
FIG. 1 is a circuit diagram, partially in block form, of a multichannel receiver having priority channel monitoring in accordance with a preferred embodiment of this invention.

Referring now to FIG. 1, there is shown a receiver of the superheterodyne type wherein signals received by an antenna 10 are amplified by a radiofrequency amplifier 11 and are applied to a first mixer circuit 12. The first mixer circuit 12 is controlled by local oscillations supplied selectively thereto by a pair of local oscillators 13 and 14, only one of which is rendered operative at a time. The output of the first mixer 12 is applied through a first IF amplifier 16, and from the amplifier 16 is a second mixer 17 which is supplied with local oscillations from an oscillator 18. The output of the second mixer 17 is applied to a second IF amplifier 20, with the modulation at the output of the amplifier 20 being derived from the signal by a discriminator 21.

Signals obtained from the output of the discriminator 21 then are passed through a pair of audio switches 22 and 23 to a audio amplifier 24, the output of which is supplied to a loudspeaker 26 for reproduction of the audio signal. The audio switch 22 is controlled by the output of a squelch circuit, to be described subsequently, and the audio switch 23 is controlled by the scanning unit; so that whenever a carrier wave is received, the output of the discriminator 21 is coupled through the switches 22 and 23 to the amplifier 24. In the absence of receipt of a carrier signal, however, no signals are passed from the discriminator 21 to the amplifier circuit 24. It should be noted that the receiver shown in FIG. 1 can be used for the reception of signals other than voice signals, and the various stages which have been described can be of various different known constructions.

The oscillators 13 and 14 are rendered selectively operated by the application of a ground potential to the oscillator from which an output is desired. Ground potential for the oscillator 13 is obtained from a common-emitter NPN transistor 30, and ground potential for the oscillator 14 is obtained from a similar NPN common-emitter transistor 31. Each of the transistors 30 and 31 in turn is controlled by the output of a respective one of a pair of transistors 34 and 35, interconnected in a substantially conventional Eccles-Jordan bistable multivibrator circuit configuration. The operation of such a bistable multivibrator is well known and is such that whenever one of the transistors 34 or 35 is conductive, the other is nonconductive and vice versa.

Whenever the transistor 34 (which arbitrarily has been chosen to correspond to the priority channel in the ensuing description) is nonconductive, a positive potential is obtained from the collector thereof and is applied through an additional NPN emitter-follower transistor 37 to render that transistor conductive which in turn renders the transistor 30 conductive to apply ground potential to the oscillator 13. Conversely, whenever the transistor 35 of the bistable multivibrator is nonconductive, the transistor 31 is rendered conductive to apply ground to the oscillator circuit 14.

The additional emitter follower 37 is provided for the priority channel in order to provide a forward biasing potential to a PNP control transistor 38 to complete a path through the transistor 38 to an indicator lamp 39, which is energized whenever a priority channel is being monitored. In the event that the indicator lamp 39 is not desired, the transistors 37 and 38 can be eliminated, with the transistor 30 being driven directly from the collector of the transistor 34 in the bistable multivibrator circuit.

Timing pulses for changing the state of the bistable multivibrator circuit 34, 35 initially are obtained from a free-running relaxation oscillator circuit 41, including a timing capacitor 42 and a discharge circuit in the form of a PNP transistor 43 and an NPN transistor 44 provided with mutually connected collector and base electrodes. The potential on the capacitor 42 is applied to the emitter electrode of the transistor 43, and the operating or switching level for the transistors 43 and 44 is established by a voltage divider in the form of a pair of resistors 46 and 47 connected between a source of positive potential and ground.

A charging path is provided for the capacitor 42; and when the charge on the capacitor reaches a level sufficient to forward bias the transistor 43, the capacitor 42 is discharged through the transistors 43 and 44 to produce a negative pulse on the collector of the transistor 44. This pulse, applied to the base of an amplifier NPN transistor 50, renders the transistor 50 conductive at the trailing edge of the pulse. As a result, a negative pulse appears on the collector of the transistor 50 and this negative pulse is coupled through a transmission gate diode 52 to the junction between a pair of clock pulse steering diodes 54 and 55, coupled to the collectors of the transistor 34 and 35 of the bistable multivibrator. This negative pulse is passed by one of the diodes 54 or 55 such that it renders nonconductive whichever one of the transistors 34 and 35 previously was conductive, thereby changing the state of the bistable multivibrator 34, 35.

It should be noted that the relaxation oscillator 41 need not necessarily be of the form shown in FIG. 1, but could be a conventional unijunction transistor or SCR relaxation oscillator. It is necessary that this oscillator operate at a low frequency of oscillation, with the frequency of oscillation in the circuit shown in FIG. 1 preferably being of the order of 3 Hz.

For the purposes of illustration, assume that the first clock pulse obtained from the relaxation oscillator 41 causes the transistor 35 of the bistable multivibrator to be driven from a nonconductive to a conductive mode of operation where the transistor 35 is saturated. A negative going waveform then appears on the collector of the transistor 35 and is coupled through a capacitor 59 to reverse bias a diode 57 to remove the normal forward bias of an NPN transistor 58 in a monostable delay circuit, rendering the transistor 58 nonconductive. As soon as this occurs, the capacitor 59 commences discharging through a resistor 60 from the source of positive potential and through the now conductive transistor 35 toward the value of the positive potential.

The charge built up on the capacitor 59 also is applied through the diode 57 to the base of the transistor 58; and after a short time interval (chosen to be 6 ms.) the charge on the capacitor is sufficiently reduced to cause the transistor 58 once again to be forward biased and rendered conductive, causing ground potential to appear on the collector thereof. This sudden drop in potential on the collector of the transistor 58 produces a negative-going step which is coupled through a coupling capacitor 61 and a diode 62 as a negative-going clock pulse to the base of the transistor 35, rendering the transistor 35 nonconductive. This in turn causes the transistor 34 of the bistable multivibrator to be rendered conductive.

The negative going pulse then appearing on the collector of the transistor 34 is coupled through a capacitor 69 to reverse bias a diode 67 to remove the normal forward bias applied to the base of an NPN transistor 68 in a second monostable delay circuit, causing the transistor 68 to be rendered nonconductive in a manner similar to that described previously for the transistor 58. The capacitor 69 then commences discharging through a resistor 70 and the collector-emitter path of the transistor 34 toward the value of the positive potential of the circuit. Since the components 69 and 70 are chosen to be equal to the components 59 and 60, after 6 ms. the charge on the capacitor 69 is sufficiently reduced to allow the transistor 68 to be driven into saturation. This then causes a negative going step to appear on the collector of the transistor 68, and this step is coupled through a coupling capacitor 71 and a diode 72 to the base of the transistor 34, rendering the transistor 34 nonconductive. This in turn renders the transistor 35 conductive, and the cycle of operation is repeated.

So long as noise is present on both of the channels being sampled by the receiver, a squelch output applied to the junctions of the capacitors 61, 71 with the diodes 62, 72 remains near ground and the foregoing sequence of operation is repeated. It should be noted that the oscillator 41 continues to provide output pulses during this rapid scanning operation controlled by the monostable time delay circuits including the transistors 58 and 68. The output clock pulses of the low-freqeuncy relaxation oscillator 41, however, occur relatively infrequently compared to the pulses obtained from the monostable delay circuits of the transistors 58 and 68, so that primary scanning control of the bistable multivibrator, and therefore of the oscillators 13 and 14, is obtained from the monostable delay circuit 58 and 68 whenever no signals are detected on either of the channels.

The output of the discriminator circuit 21 is continuously monitored by a frequency-sensitive squelch circuit 80, with the signals present at the output of the discriminator 21 being applied through a coupling capacitor 81 to the input of the squelch circuit 80. The output of the squelch circuit 80 is a sequence of constant width positive pulses, the repetition rate of which is directly related to the frequency of the detected noise and modulation signals. This repetition rate is high when no carrier is present and is low when a carrier is present. The squelch output pulses are applied to the base of a normally nonconductive NPN transistor 85 which is rendered conductive for the duration of each squelch output pulse. Each time the transistor 85 conducts, ground potential is applied from the collector of the transistor 85 through a resistor 86 to a noise level storage capacitor 87.

The capacitor 87 is charged through a pair of resistors 89 and 86 from the source of positive potential to a predetermined positive potential. Each time a pulse is obtained from the squelch circuit 80, however, the capacitor 87 is partially discharged through the transistor 85 for the length of time that the transistor 85 is conductive. During a condition of operation when no carrier is present (and noise is present), the transistor 85 is rendered conductive almost continuously; so that the capacitor 87 is discharged to near ground potential.

The potential present on the capacitor 87 is coupled through a resistor 91 to the base of an NPN transistor 93, forming one of the two transistors in a differential amplifier 92, the other transistor of which is an NPN transistor 94. The emitters of the transistors 93 and 94 are connected together and through a common emitter resistor 97 to ground. A reference potential, establishing the switching level of the differential amplifier 92, is applied to the base of the control transistor 94 of the amplifier through a voltage divider consisting of a pair of resistors 98 and 99 connected between the source of positive potential and ground.

As long as noise signals are present on the line, the capacitor 87 is discharged to a value such that the potential on the base of the transistor 93 is less positive than the potential on the base of the control transistor 94. As a result, the transistor 94 is rendered conductive, causing near ground potential to be obtained from the collector of the transistor 94. This potential is the squelch output potential and is applied over a lead 101 to the junction of a pair of resistors 102 and 103 which are connected, respectively, to the junctions between the capacitors 61 and 71 with the diodes 62 and 72. With this squelch output potential near ground, the operation of the circuit is as has been described previously. At the same time, near ground potential is applied over a lead 105 to the audio switch 22 to open the audio switch; so that no signals are passed from the output of the discriminator 21 to the audio amplifier 24.

Assume now that the receiver is scanning a nonpriority channel and a carrier is detected. In such an event, no pulses, or relatively few pulses, are passed by the squelch circuit 80 to the transistor 85; so that the transistor 85 remains nonconductive, thereby permitting the capacitor 87 to be charged to a potential sufficient to cause the potential on the base of the transistor 93 to be more positive than the reference potential on the base of the transistor 94. When this occurs, the transistor 93 is rendered conductive, and the transistor 94 is rendered nonconductive; so that the potential on the leads 101 and 105 rises to a positive value. The positive potential on the lead 105 closes the audio switch 22 permitting the passage of audio signals through the switch 22.

At the same time, the positive potential applied over the lead 101 appears at the junctions of the capacitors 71 and 61 with the diodes 72 and 62, respectively, thereby inhibiting the passage of any further negative-going pulses through the diodes 62 and 72 from the collectors of the transistors 58 and 68. As a consequence, further operation of the bistable multivibrator 34, 35 under the control of the monostable delay circuits 58 and 68 is terminated, and both transistors 58 and 68 are conductive.

The positive potential on the lead 101 also is applied through a circuit consisting of a diode 111 and a pair of series-connected resistors 117, 118 to the junction of the coupling capacitor 53 and the diode 52 used to couple the negative going output pulses from the relaxation oscillator 41 to the bistable multivibrator. When a positive potential is present at this junction, the negative-going clock pulses from the relaxation oscillator 41 are inhibited from being applied to the bistable multivibrator, so that the bistable multivibrator remains set to the stable state on which the carrier was detected.

In order to permit monitoring of the priority channel, however, when a carrier is detected on the nonpriority channel, it is necessary to permit switching of the bistable multivibrator 34, 35 to the priority state of operation. To accomplish this, the positive potential obtained from the collector of the transistor 35 when the multivibrator is set to its nonpriority state is applied to the base of an NPN gate transistor 115 to render the transistor 115 conductive. The collector of the transistor 115 is coupled through a coupling resistor 116 to the junction between the resistors 117 and 118 thereby enabling the passage of the output pulses from the relaxation oscillator 41 through the diode 52 to the bistable multivibrator 34, 35.

As a consequence, whenever a carrier is detected on a nonpriority channel, the next timing or clock pulse obtained from the output of the relaxation oscillator 41 is passed by the diode 52, due to the fact that the transistor 115 is conductive each time that the nonpriority channel is being sampled or monitored by the circuit. This clock pulse causes the transistor 35 in the bistable multivibrator to be rendered conductive and the transistor 34 to be rendered nonconductive, so that the oscillator 13 in turn is rendered operative. When the transistor 35 is rendered conductive, the transistor 115 is in turn rendered nonconductive, so that control of the inhibiting of the output of the relaxation oscillator 41 is solely under the control of the output transistor 94 in the squelch circuit 80. If a carrier now is detected on the priority channel, the output of the squelch circuit obtained from the collector of the transistor 94 once again becomes positive, thereby inhibiting further operation of either of the monostable delay circuits 58 and 68. At the same time, the positive potential applied to the cathode of the diode 52 inhibits the passage of any further negative-going clock pulses from the output of the relaxation oscillator 41. This state of operation then remains for so long as a carrier is present on the priority channel. As soon as the carrier cease to be detected on the priority channel, the output of the squelch circuit at the collector of the transistor 94 drops to near ground potential, thereby enabling all of the timing circuits so that the operation of the scanning system may be resumed.

In order to provide increased sensitivity for detecting the presence of a carrier on the nonpriority channel, the output potential on the collector of the transistor 34 is applied through a resistor 120 to the base of the reference and output transistor 94 of the differential output amplifier 92 in the squelch circuit. When the transistor 34 is conductive, ground potential is present on the collector thereof, so that the resistor 120 effectively is connected in parallel with the resistor 99. The resistor 120 is of substantially greater impedance than either of the resistors 98 or 99, so that a relatively slight change of biasing voltage is applied as a reference voltage to the base of the transistor 94 when the circuit is monitoring or is switched to a nonpriority channel.

When a priority channel is being monitored, the transistor 34 is nonconductive, so that positive potential is applied from the source of positive potential through the parallel combination of the collector resistor for the transistor 34 and the resistor 120 in parallel with the resistor 98 to the junction at the base of the transistor 94 and through the resistor 99 to ground. This combination causes a more positive biasing potential to be applied to the base of the transistor 94, so that the capacitor 87 must be charged to a higher positive potential for detection of a carrier on the priority channel than it is for detection of a carrier on the nonpriority channel. Thus, the sensitivity of the squelch circuit is decreased whenever the priority channel is being monitored. This change in the sensitivity of the squelch circuit 80 is made in order to insure that a priority channel is locked onto by the circuitry only if a priority carrier is present and that statistical noise nulls do not cause an erroneous locking. This is done to prevent noise bursts in the audio of a nonpriority channel being received when the priority sampling takes place.

In order to provide muting of the audio output whenever a new channel is being sampled by the circuit, and to provide a delay in the unmuting of the audio output to allow time for the new channel oscillator 13 or 14 to build up oscillations upon initial selection, the additional audio switch 23 is provided. This audio switch includes a transistor 125 connected so that the collector-emitter path thereof shunts audio signals to ground when the transistor 125 is conductive. The transistor 125 normally is nonconductive, but the base is supplied with input signals obtained from the collectors of the monostable delay transistors 58 and 68. Whenever either one of the transistors 58 or 68 is nonconductive, a positive potential is applied to the base of the transistor 125 rendering it conductive, shunting all audio signals applied to the collector to ground.

It will be noted that the transistors 58 and 68 are rendered nonconductive in their nonstable states, providing the 6 ms. delay, before they are rendered conductive to provide the negative clock pulse to reset the bistable multivibrator 34, 35 to its opposite stable state. Thus, during the rapid scanning operation, when one or the other of the transistors 58 and 68 is always nonconductive, during the sampling of the priority channel while receiving nonpriority messages, and for the 6 ms. time period immediately following selection of a channel on which a carrier is detected, the transistor 125 is conductive to mute the audio output. At all other times, the transistor 125 operates as an open switch and has no affect on the circuit.

In order that the operator of the receiver utilizing the circuit shown in FIG. 1 may be provided with an indication of the change from a nonpriority to a priority channel most conveniently, an audio attenuating circuit in the form of an attenuating resistor 127 and a switching transistor 128 is provided across the input to the audio switch 22. Whenever the transistor 35 is nonconductive, indicating reception or scanning on a nonpriority channel, a positive potential is applied to the base of the transistor 128 rendering it conductive, thereby inserting the resistor 127 in shunt across the input of the audio switch to ground. As a consequence, a portion of the audio signal passed to the input of the audio switch 22 is attenuated by the resistor 127; so that the signal level at the loudspeaker 26 is correspondingly reduced. When the priority channel is received, however, the transistor 128 is rendered nonconductive, so that the audio signal obtained from the output of the discriminator 21 is not attenuated and is reproduced at full strength by the loudspeaker 26. Thus, if a nonpriority channel is being received, and a priority carrier is detected during the priority sampling interval or window, the locking on of the receiver to the priority channel is accomplished by a corresponding increase in the audio output level which is heard from loudspeaker 26.

As stated previously, the lamp 39 provides a visual indication of when the receiver is receiving signals on the priority channel. In order to prevent a dim or flickering output from the lamp 39 during the time that the channel scanning flip-flop 34, 35 is being switched back and forth to scan the priority and nonpriority channels, a pair of additional transistor amplifiers in the form of a cascaded NPN transistor 137 driving a PNP transistor 138 is provided. The transistor 137 is rendered conductive by the positive potential appearing on the collector of the monostable transistor 58 whenever the transistor 58 is nonconductive. Conduction of the transistor 137 causes the transistor 138 to be conductive to apply a positive potential from the collector of the transistor 138 to the base of the transistor 38, rendering the transistor 38 nonconductive during the timeout cycle of the monostable delay circuit including the transistor 58. As a result, the lamp 39 is provided with energizing current only for steady state monitoring of the priority channel after the monostable delay circuits have reverted to their stable states.

Since a receiver system of the type shown in FIG. 1 ordinarily is employed in conjunction with a transmitter receiver combination, a provision must be made to disable the operation of the bistable multivibrator when the radio apparatus is placed in the transmit mode. This is accomplished by the provision of a "push-to-talk" switch 130 which is closed to apply ground potential to a transmit-receive PNP switching transistor 131 whenever the radio is to be placed in the transmit mode. This renders the transistor 131 conductive to apply a positive forward biasing potential to the base of a pair of control transistors 132 and 133, rendering those transistors conductive. The collectors of the transistors 132 and 133 are connected to the collectors of the transistors 35 and 34, respectively, of the bistable multivibrator thereby preventing the transistors 30 and 31 from being rendered conductive; so that both of the oscillators 13 and 14 are disabled. At the same time, the positive potential appearing on the collector of the transistor 131 is applied to the base of a transmit mode PNP switching transistor 135 to render the transistor 135 conductive, which in turn provides an operating path for the transmitter frequency control components of the radio which are indicated in a block 136.

Figure 2:
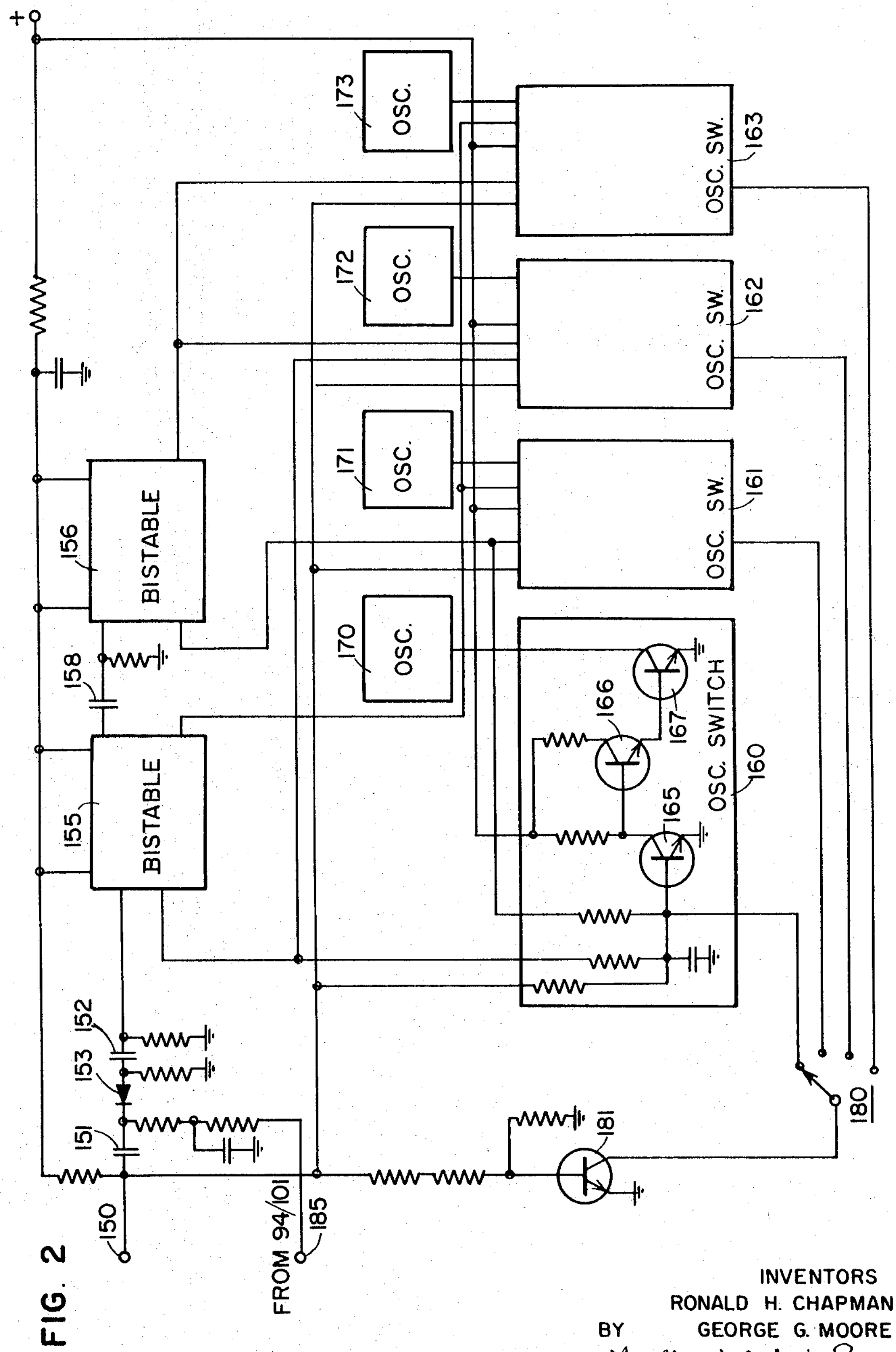
FIG. 2 is a schematic diagram of a modification of the circuit shown in FIG. 1.

Referring now to FIG. 2, there is shown an embodiment to be utilized in conjunction with the circuitry shown in FIG. 1 for expanding the system from a two-channel mode of operation to a four-channel mode of operation, with one of the channels being designated a priority channel. When this is done, the oscillators 13 and 14 are replaced with oscillators controlled by the circuitry shown in FIG. 2 and the common-emitter amplifiers 30, 31 and 37 no longer are utilized in conjunction with the bistable multivibrator 35, 34.

The output pulses obtained from the collector of one of the transistors 34 or 35 (assume that these pulses are obtained from the transistor 34) are applied to an input terminal 150 and are coupled through a pair of coupling capacitors 151 and 152 and a diode 153 to the input of a two-stage binary counter including a pair of bistable multivibrators or flip-flops 155 and 156. The bistable multivibrator 155 and 156 have substantially the same configuration as the bistable multivibrator 34, 35 and are supplied with a source of positive operating potential. Whenever the transistor 34 is rendered conductive, a negative step appearing on the collector thereof is made into pulses by the capacitor 151 and the negative one is passed by the diode 153 and triggers the flip-flop 155 to a different stable state of operation. Alternate negative steps applied to the terminal 150 result in the triggering of the flip-flop 156 by the output of the flip-flop 155 coupled through a coupling capacitor 158 in order to change the state of the flip-flop 156. As a result, the flip-flops 155 and 156 operate as a conventional two-stage binary counter; and the four different counts or combinations of outputs obtained from these flip-flops are applied to four different oscillator control switching circuits 160, 161, 162 and 163, each of these circuits being responsive to a different count in the flip-flops 155 and 156. Only the switching circuit 160 has been shown in detail since the circuits 160 to 163 all are identical.

Each of the switching circuits includes three NPN transistors; a "NOR" gate transistor 165, emitter-follower 166, and oscillator switch 167. The output from the switching circuit is obtained from the collector of the transistor 167 which, when it is conductive, applies ground potential to a corresponding one of four local oscillators 170, 171, 172 and 173 connected respectively to the switches 160 to 163. The oscillators 170 to 173 are substituted for the oscillators 13 and 14 shown in FIG. 1.

Selection of the particular switch 160 to 163 which is rendered conductive is under control of a three-input NOR gate at the input of the input transistor 165 for each of the switches. A first one of the inputs to this NOR gate is applied from the lead 150 and exists when the transistor 34 is conductive to apply ground potential to the terminal 150. This potential is applied to all of the switches 160 to 163. Two other input potentials are obtained, one from each of the flip-flops 155 and 156, and constitute the other inputs to the NOR gates for each of the switches; and when all three of these inputs are at ground potential simultaneously, the transistor 165 is rendered nonconductive. This causes the transistor 166 to be rendered conductive, driving the transistor 167 conductive to cause ground potential to appear on the collector thereof.

If any one of the three inputs to the NOR gate connected to the base of the transistor 165 is at a positive potential, the transistor 165 is rendered conductive, which in turn causes the transistor 167 to be rendered nonconductive. Thus, only when the transistor 34 is rendered conductive, can any one of the switches 160 to 163 be operated, and then the particular switch being operated depends on the permutations of the outputs of the flip-flops 155 and 156.

Stepping of the counter is under the control of the relaxation oscillator 41 and the monostable delay circuits including the transistors 58 and 68 operating in the same manner as described previously. Whenever a carrier is detected on a channel, the monostable delay circuits 58 and 68 are disabled and further stepping of the bistable multivibrator 34, 35 is terminated; with the exception that the bistable multivibrator 34, 35 is triggered by clock pulses from the low-frequency relaxation oscillator 41 to periodically scan a priority channel.

Selection of which of the oscillators 170 to 173 is to be associated with the priority channel is accomplished under the control of a priority select switch 180, which is shown in FIG. 2 as being connected to the input of the switch stage 160. Control of the potential appearing on the switch 180 is obtained from a transistor 181, the collector of which connects to the switch 180 and the emitter of which is connected to ground. The base of the transistor 181 is supplied with operating potential from the terminal 150; so that whenever the transistor 34 is conductive, which is the state when a nonpriority channel is being monitored, ground potential is applied to the base of the transistor 181 and it is nonconductive, causing the priority switch to have no affect on the circuit. The next negative-going clock pulse from the relaxation oscillator 41 triggers the bistable multivibrator 34, 35 to render the transistor 34 nonconductive and the transistor 35 conductive. As a consequence, a positive potential is applied from the collector of the transistor 34 to the terminal 150 disabling all of the switches 160 to 163 so that no ground potential is obtained from the output thereof, thereby causing termination of operation on the channel which previously was being monitored. This same positive potential, however, applied to the base of the transistor 181, renders that transistor conductive to apply ground potential directly through the switch 180 to the base of the input transistor 165 in the switch circuit 160. This causes the transistor 165 to be rendered nonconductive which in turn causes the transistors 166 and 167 to be rendered conductive so that ground potential is applied to the priority oscillator 170.

If no carrier is detected during the timing period for the monostable delay circuit including the transistor 68 (FIG. 1), the negative output pulse of the transistor 68, when it is subsequently rendered conductive, triggers the multivibrator back to its previous state of operation with ground potential being obtained from the collector of the transistor 34. This then causes the system to switch back to a nonpriority scanning mode of operation with continued switching pulses being applied through the monostable circuits including the transistors 58 and 68 until a nonpriority channel carrier is detected. The system then locks onto the nonpriority channel, with sampling intervals on the priority channel as has been previously described.

Whenever a carrier is detected on any channel, a positive potential is obtained from the collector of the transistor 94 and is applied over the lead 101 to the terminal 185 to reverse bias the diode 153. This inhibits further pulses from the transistor 34 from being applied to the bistable multivibrator 155 and insures that the system samples between the nonpriority channel having the detected carrier and the priority channel without scanning the other two nonpriority channels. In the event that a priority carrier is detected during the sampling interval, further stepping of the bistable circuit 34, 35 is inhibited in the manner described previously in conjunction with FIG. 1; and the switch 160 continues to apply ground potential to the oscillator 170 until the priority carrier no longer is received.

In the foregoing description, the embodiment shown in FIG. 1 has been described in conjunction with a fixed priority being assigned to the oscillator 13. It should be apparent, however, that appropriate switches can be provided; so that the priority can be switched between the oscillators 13 and 14 merely by reversing the control circuits used to establish the priority from one side of the multivibrator circuit 34, 35 to the other. The reference level for controlling the sensitivity of the squelch circuit differential output amplifier also could be obtained from the monostable circuits.

In addition an indicator lamp, such as the indicator lamp 39, may be provided for the channel associated with the oscillator 14 or may be provided for both of the channels if so desired. Either or both of the lamps could be provided with a blanking circuit of the type described, so that the indicating lamp or lamps are energized only when carrier is detected on a channel, and flashing of the lamps is avoided during the scanning mode of operation.

We claim:

1. A radio receiver of the superheterodyne type for receiving signals on a predetermined number of channels, one of which is designated a priority channel, said receiver having a channel scanning and priority channel monitoring circuit including in combination:

mixing means operative to provide reception by said radio receiver on said different channels;

oscillator means connected to the mixing means for providing output signals to the mixing means at different frequencies corresponding to said different channels;

pulse responsive switching means, having at least first and second conditions of operation, coupled to the oscillator means for controlling the output frequency of the oscillator means in accordance with the condition of operation of the switching means;

first clock pulse producing means for providing clock pulses to the switching means at a predetermined frequency, each clock pulse applied to the switching means causing the switching means to change its condition of operation;

second clock pulse producing means responsive to an output obtained from the switching means upon a change of condition of operation thereof for applying clock pulses to the switching means to change the condition of operation of the switching means, the frequency of operation of the second clock pulse producing means being different from said predetermined frequency;

means for detecting the presence of a received signal on a channel for inhibiting the application of pulses from said first and second clock pulse producing means to the switching means; and means responsive to a predetermined output condition of the switching means for disabling the inhibiting of the first clock producing means by the signal detecting means, so that a clock pulse from the first clock pulse producing means is applied to the switching means to change the condition of operation thereof irrespective of the detection of a received signal by the signal detecting means.

2. The combination according to claim 1 wherein the switching means is a bistable multivibrator.

3. The combination according to claim 2 wherein the second clock pulse producing means includes two monostable delay circuits, each producing an output pulse a predetermined time interval after different changes of state of the bistable multivibrator, the output pulses of the monostable delay circuits controlling opposite conditions of operation of the bistable multivibrator to change the state thereof.

4. The combination according to claim 2 wherein the first clock pulse producing means is an oscillator means and the second clock pulse producing means includes at least one monostable timing circuit producing an output pulse in response to a change of condition of the bistable multivibrator in a time interval which is substantially less than the time interval between pulses obtained from the oscillator means.

5. The combination according to claim 4 wherein the oscillator means is a free-running oscillator and wherein the second clock pulse producing means includes a pair of monostable delay circuits, each having a time delay interval which is substantially less than the interval between pulses produced by the free running oscillator.

6. The combination according to claim 1 wherein the means for disabling the inhibiting of the first clock pulse producing means operates in response to an output condition of the switching means corresponding to a nonpriority channel to permit the application of a clock pulse from the first clock pulse generating means to the switching means when a signal is detected on a nonpriority channel.

7. The combination according to claim 6 wherein the switching means is a bistable multivibrator, one output of which corresponds to a priority channel and the other output of which corresponds to a nonpriority channel.

8. The combination according to claim 7 wherein said radio receiver includes an audio amplifier and an audio reproducing means and further including means for attenuating the signals applied to the audio amplifier, said attenuating means being operated in response to the output of the bistable multivibrator corresponding to the nonpriority channel.

9. The combination according to claim 8 wherein the attenuating means includes an impedance connected in series with a switching means for shunting a portion of the audio signals to ground whenever the switching means is closed, the switching means being closed in response to the nonpriority output of the bistable multivibrator.

10. The combination according to claim 7 further including means for changing the sensitivity of the received signal detecting means in accordance with the state of the outputs of the bistable multivibrator.

11. The combination according to claim 10 wherein the sensitivity of the means for detecting received signals is decreased when the bistable multivibrator provides the output corresponding to the priority channel.

12. The combination according to claim 11 wherein the means for detecting received signals includes a differential amplifier provided with a reference potential for establishing the level of received signal necessary before an output is produced therefrom, the reference potential being at a predetermined level established by a voltage divider when the bistable multivibrator is set to its nonpriority state, with the output of the bistable multivibrator set to its priority state causing a different reference potential to be applied to the differential amplifier to decrease the sensitivity of the detecting means when the priority channel is being scanned.

13. The combination according to claim 1 wherein the switching means includes a counting circuit having a plurality of stages in excess of two.

14. The combination according to claim 13 wherein the switching means includes a bistable multivibrator driving the counting circuit, with the output pulses of the first and second clock pulse producing means being applied to the bistable multivibrator, and with one output of the bistable multivibrator constituting the driving pulses for the counter circuit.

15. A radio receiver of the superheterodyne type for receiving signals on a predetermined number of channels, one of which is designated a priority channel, said receiver having a channel scanning and priority channel monitoring circuit including in combination:

mixing means operative to provide reception by said radio receiver on said different channels;

oscillator means connected to the mixing means for providing output signals to the mixing means at different frequencies corresponding to said different channels;

switching means having at least first and second conditions of operation coupled to the oscillator means for controlling the output frequency of the oscillator means in accordance with the condition of operation of the switching means, the first condition of operation of the switching means corresponding to the priority channel;

clock pulse producing means for applying clock pulses to the switching means to cause the switching means to change its condition of operation;

means for detecting the presence of a received signal on a channel for inhibiting the application of clock pulses from the clock pulse producing means to the switching means; and means coupled with the switching means and responsive to the conditions of operation of the switching means for changing the sensitivity of the received signal detecting means in accordance with the conditions of operation of the switching means.

16. The combination according to claim 15 wherein the sensitivity of the received signal detecting means is decreased for the output condition of the switching means corresponding to the priority channel.

17. The combination according to claim 16 wherein the means for detecting received signals includes a differential amplifier provided with a reference potential for establishing the level of received signal necessary before an output is produced therefrom, the reference potential being at a predetermined level established by a voltage divider when the condition of operation of the switching means corresponds to a nonpriority channel, with the first condition of operation of the switching means causing a different reference potential to be applied to the differential amplifier for decreasing the sensitivity of the received signal detecting means when the priority channel is being scanned.